(12) United States Patent
Camp, Jr.

(10) Patent No.: US 7,715,865 B2
(45) Date of Patent: May 11, 2010

(54) COMPRESSED MODE FOR REDUCING POWER CONSUMPTION

(75) Inventor: William O. Camp, Jr., Chapel Hill, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 655 days.

(21) Appl. No.: 11/614,488

(22) Filed: Dec. 21, 2006

(65) Prior Publication Data

US 2008/0151797 A1    Jun. 26, 2008

(51) Int. Cl.
*H04B 7/00* (2006.01)

(52) U.S. Cl. ............... 455/522; 455/72; 455/127.1; 370/311; 370/320

(58) Field of Classification Search ........... 455/522, 455/69, 561, 502, 127.1, 72; 370/509, 311, 370/335, 342, 208, 338, 320; 375/222, 377
See application file for complete search history.

(56) References Cited

U.S. PATENT DOCUMENTS

| | | | | |
|---|---|---|---|---|
| 6,064,693 | A * | 5/2000 | Oliver et al. ............... | 375/222 |
| 2002/0176513 | A1* | 11/2002 | Gouessant et al. .......... | 375/297 |
| 2003/0137958 | A1* | 7/2003 | Yano et al. ................. | 370/335 |
| 2003/0193969 | A1 | 10/2003 | Pecen et al. | |
| 2004/0218567 | A1* | 11/2004 | Budka et al. .............. | 370/332 |
| 2005/0227732 | A1* | 10/2005 | Hiraki ........................ | 455/561 |
| 2006/0251014 | A1 | 11/2006 | Castor | |
| 2006/0285481 | A1* | 12/2006 | Lane et al. ................. | 370/208 |
| 2007/0082620 | A1* | 4/2007 | Zhang et al. ................ | 455/69 |
| 2008/0146174 | A1* | 6/2008 | Flowers .................... | 455/127.1 |
| 2008/0151812 | A1* | 6/2008 | Camp et al. ................. | 370/320 |
| 2008/0153429 | A1* | 6/2008 | Johnson et al. .............. | 455/72 |
| 2008/0153532 | A1* | 6/2008 | Camp ......................... | 455/522 |
| 2008/0240013 | A1* | 10/2008 | Johnson et al. ............. | 370/315 |
| 2008/0268799 | A1* | 10/2008 | McCune et al. ........... | 455/127.2 |

FOREIGN PATENT DOCUMENTS

| | | |
|---|---|---|
| DE | 10053205 A1 | 5/2002 |
| EP | 1137203 A2 | 9/2001 |
| EP | 1626608 A1 | 2/2006 |
| EP | 1708427 A1 * | 10/2006 |

(Continued)

OTHER PUBLICATIONS

Carnero, J. O. "Uplink Capacity Enhancement in WCDMA." PhD Thesis for the Department of Communication Technology, Institute of Electronic Systems, Aalborg University, Mar. 31, 2004. Available at: http://Kom.aau.dk/ADM/research/reports/Reivew%20Carnero.pdf.

(Continued)

*Primary Examiner*—Tan Trinh
(74) *Attorney, Agent, or Firm*—Coats & Bennett, P.L.L.C.

(57) ABSTRACT

A radio terminal switches between a compressed transmission mode and a normal transmission mode based on the current transmit power level of the radio terminal. The radio terminal periodically compares its current transmit power level to a power threshold. The radio terminal transmits in the compressed transmission mode when the current transmit power level is below the threshold, and transmits in the normal transmission mode when the current transmission power level is greater than the threshold. The radio terminal may also operate in a compressed receiving mode.

44 Claims, 6 Drawing Sheets

FOREIGN PATENT DOCUMENTS

| | | | |
|---|---|---|---|
| FR | 2858903 | A1 | 2/2005 |
| GB | 2359700 | A | 8/2001 |
| WO | 97/40593 | | 10/1997 |
| WO | 00/38349 | A1 | 6/2000 |
| WO | 00/74291 | A1 | 12/2000 |

OTHER PUBLICATIONS

International Search Report, International Application No. PCT/US2007/077728, Date of Mailing: Mar. 20, 2008.

International Search Report, International Application No. PCT/US2007/077732, Date of Mailing:Mar. 20, 2008.

Annex to Form PCT/IDS/206, Communication Relating to the Results of the Partial International Search, International Application No. PCT/US2007/077051, Date of Mailing: May 7, 2008.

PCT—International Search Report dated Oct. 15, 2008, for Application No. PCT/US2007/077051, Filed Aug. 29, 2007.

* cited by examiner

COMPRESSED MODE FOR REDUCING POWER CONSUMPTION

BACKGROUND

Wideband Code Division Multiple Access (WCDMA) phones have recently been introduced into the market. While WCDMA phones provide much higher data rates than phones using older technologies, the newer WCDMA phones consume more power and drain batteries more quickly. Consequently, the battery life and "talk times" for WCDMA phones is significantly less than phones using older technology. The reduced battery life and talk time for WCDMA phones is undesirable from a consumer perspective.

When engaged in normal voice communications, a WCDMA phone transmits and receives continuously. This continuous operation is one of the primary reasons for the undesirable current drain in WCDMA phones. Another reason for current drain is the presence of a duplexer in the transmit path. The duplexer introduces an undesirable path loss, but is necessary in WCDMA phones because the transmitter and receiver are on simultaneously. Older phones using time division multiplexing, such as GSM phones, switch off the transmitter and receiver for significant portions of time, which results in less drain on the battery. Additionally, a phone employing time division multiplexing does not need a duplexer because the transmitter and receiver can be turned on at different times.

Accordingly, there is a continuing need for new systems and methods to reduce power consumption in WCDMA terminals.

SUMMARY

To reduce power consumption in a mobile terminal, a compressed mode is used on an uplink channel from the mobile terminal to a base station. The mobile terminal switches between the compressed mode and a normal mode based on the current transmit power level of the mobile terminal. The mobile terminal periodically compares its current transmit power level to a power threshold, transmits in compressed mode when the current transmit power level is below the threshold, and transmits in normal mode when the current transmission power level is greater than the threshold. The network can selectively enable or disable compressed mode on the uplink based on the current utilization of uplink capacity. Compressed mode may be disabled when the uplink is heavily loaded and enabled when it is lightly loaded and there is excess uplink capacity.

The present invention may be used also on the downlink channel from the base station to a mobile terminal. In this case, the base station signals the mobile terminal to operate its receiver in a compressed mode when the base station transmits in the compressed mode. The base station may control compressed mode for a particular mobile terminal based on the power availability of the base station power amplifier to support higher data rates required by the compressed mode for that mobile terminal. Further, the base station or other network node may elect to allow some terminals to enter compressed mode on the downlink based on the current downlink power required for that terminal, and possibly the power required by other terminals, such that optimum utilization of the limited base station power can occur.

In one exemplary embodiment, different compression patterns are defined for the uplink and downlink channels. The compression patterns used on the uplink and downlink channels are defined such that the transmissions on the uplink and downlink channels occur at different times. Accordingly, it is possible to configure the transmit path to bypass duplexing circuits for further power savings.

DETAILED DESCRIPTION

The present invention provides a method of reducing power consumption in a radio communication system. The present invention is described herein in the context of a WCDMA radio communication system, though the techniques can be applied in other radio communication systems. Further, this application explains how the principles of the present invention can be applied to a voice channel in a WCDMA system. However, the principles described herein can be applied to other types of information, such as audio, video, and other data.

Figure 1:
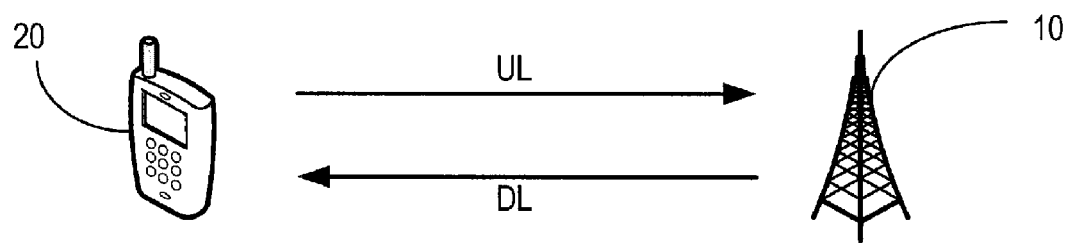
FIG. 1 is a schematic diagram of a communication system.
Figure 2:
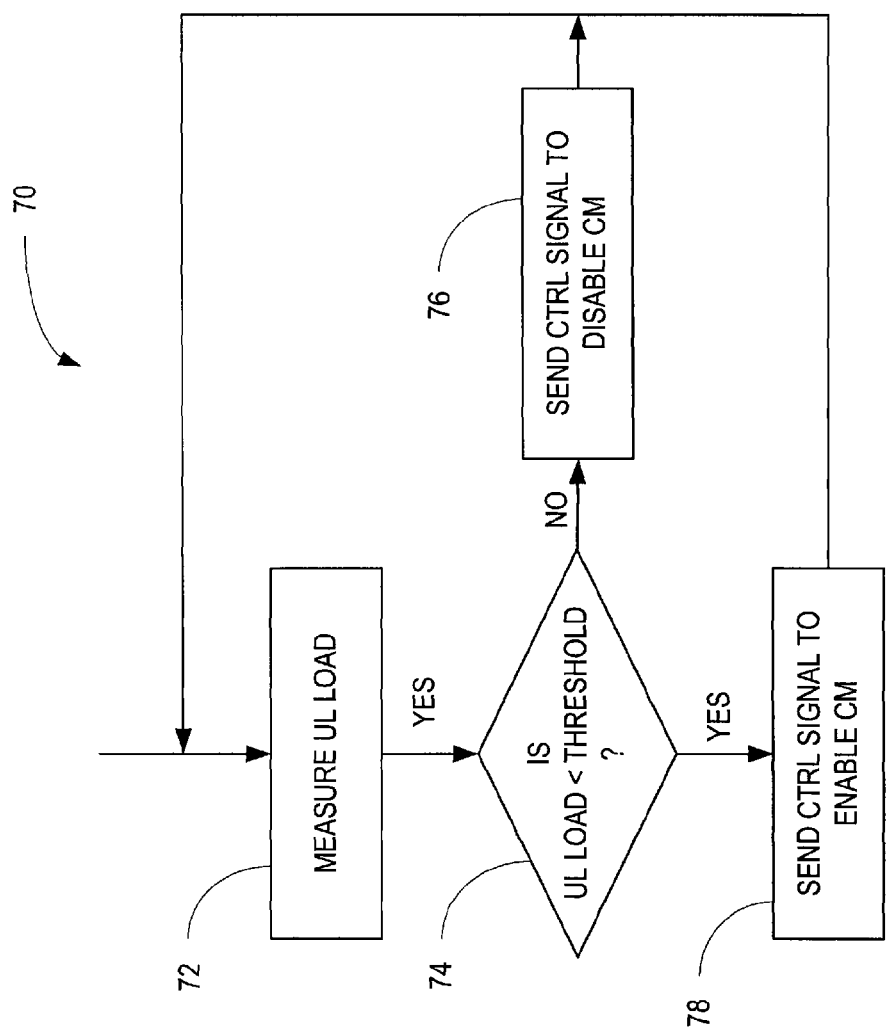
FIG. 2 is flow chart illustrating a method implemented in a base station to selectively enable/disable compressed mode operation.

FIG. 1 illustrates communications between a base station 10 in a mobile communication system and a mobile terminal 20. The base station 10 transmits voice to the mobile terminal 20 over a downlink channel (DL). The mobile terminal 20 transmits voice to the base station 10 over an uplink channel (UL). For normal voice communications, the transmitter and receiver of the mobile terminal 20 are turned on continuously. The "always on" characteristic of voice communications in WCDMA systems results in excessive drain on battery power of the mobile terminal 10.

According to the present invention, a compressed mode of operation is defined for both the uplink and downlink channels. When compressed mode is employed on the uplink channels, the mobile terminal 20 operates in a compressed transmission mode, and the base station operates in a compressed receiving mode. Conversely, when the compressed mode is applied to the downlink channel, the base station operates in a compressed transmission mode, and the mobile station operates in a compressed receiving mode. The compressed modes can be applied independently on the uplink and downlink channels. However, significant advantages can be obtained by coordinating the compressed modes for the uplink and downlink channels as will be hereinafter described.

In compressed mode, the transmitting terminal (either mobile terminal 20 or base station 10) alternately turns its transmitter on and off according to a defined compression pattern having a desired duty factor. The receiving terminal alternately turns its receiver on and off according to the same compression pattern. The compression pattern, and consequently the duty factor, is selected depending on the amount of power headroom of the transmitting terminal. Other factors may also be taken into account in selecting the duty factor. Turning off the transmitter and receiver will reduce power consumption. In order to support the same average data rate in either the uplink or downlink, the instantaneous data rate during the on time must be raised by a ratio of one over the duty factor. The transmit power for the transmitting terminal and/or base station may be increased during on periods to support a higher instantaneous data transmission rate. The increased transmit power compensates for the idle slots in the transmission period.

As an example, consider a mobile terminal 20 having a maximum transmit power level $P_{MAX}$ of 24 dBm. The mobile terminal 20 is transmitting at a data rate R1, which requires the mobile terminal 20 to transmit at a power level equal to 21 dBm in normal mode. In this example, the mobile terminal 20 has power headroom equal to 3 dBm. The mobile terminal 20 may switch to a compressed mode with a 50% duty factor and raise the transmit power level to 24 dBm when the mobile terminal 20 is transmitting on the uplink channel. This 3 dB increase in output power supports the two times increase in instantaneous data rate during the on period. If the mobile terminal 20 were, instead, transmitting at a power level equal to 18 dBm in normal mode, the mobile terminal 20 could reduce the duty cycle to as low as 25%, in which case the mobile terminal 20 may increase the transmit power level up to 24 dBm. Maximum current savings occur when the mobile terminal 20 is transmitting at moderate (0 dBm) and lower output power levels, because the mobile terminal 20 transmitter will not draw a significantly higher current at the higher data rate and higher output power. The time averaged power consumption of the mobile terminal transmitter will thus decrease with compressed mode. Even at higher terminal output power levels, the time averaged power consumption of the mobile terminal power amplifier will remain essentially unchanged, because of the increase in current drain of the power amplifier will be offset by the lower duty factor of operation when in the compressed mode, and the rest of the mobile terminal 20 gains from the compressed mode. Thus, there will be a significant savings in power drain when the mobile terminal 20 switches to compressed mode.

The base station 10 or network may control when the mobile terminal 20 is allowed to operate in compressed uplink mode based on the utilization of the uplink channel. The use of compressed mode by multiple terminals will likely result in collisions in time of higher output power mobile transmit bursts, which in turn will decrease the total uplink capacity of the system due to increased noise at the base station receiver from these collisions. Therefore, compressed mode should be enabled only when there is sufficient uplink capacity to support the higher transmit powers of the mobile terminals 20 in the compressed mode.

The same compressed mode technique can be applied on the downlink channel. In this case, the base station 10 can signal the mobile terminal 20 to switch to a downlink compressed mode and may also specify the compression pattern and duty factor to apply. In this case, the mobile terminal 20 turns off its receiver in accordance with the defined compression pattern. To maintain a desired data rate, the base station 10 may transmit data at a higher data rate during the on periods while in compressed mode. Because the mobile terminal receiver draws approximately the same current regardless of the data rate, switching to compressed mode will significantly reduce the current drain on the battery.

The base station 10 should only switch a mobile terminal 20 into downlink compressed mode when there is available base station power to support the higher data rate to the terminal in downlink compressed mode. Base station power can be limited by the total base station transmitter power output capability, or may be limited by a maximum power output that can be devoted to a single mobile terminal (often in the range of +30 dBm.) Thus, the decision to switch a particular mobile terminal 20 to downlink compressed mode and the duty factor to apply can depend on the available transmitter power at the base station 10.

Further, the base station 10 may make the decision to switch a particular mobile terminal 20 to downlink compressed mode and by how much based on the transmitted base station power devoted to other mobile terminals 20. For instance, a mobile terminal 20 consuming only +15 dBm power output would require only +18 dBm when going to 50% duty factor downlink compressed model, but a terminal presently consuming +27 dBm would require +30 dBm under the change to downlink compressed mode. In the first case, the increase in base station power required is +15 dBm and in the second case +27 dBm is required. It may be desirable to put the most mobile terminals 20 into downlink compressed mode and the optimum way to do that would be to switch the mobile terminals 20 requiring the least increase in base station output power first and continue this process for mobile terminals 20 with successively higher present output power consumption until the total base station output power limit is reached.

When compressed mode is applied on both the uplink and downlink channels, it may even be possible to turn off processing hardware to further reduce the power consumption. For example, if compressed mode with a 25% duty factor is used on both uplink and downlink channels, the processing hardware of the mobile terminal 20 can be turned off approximately 50% of the time, assuming that the on periods on the uplink and downlink channels do not overlap. If the on periods on the uplink and downlink channels do overlap, the processing hardware may be turned off for more than 50% of the time. On the other hand, staggering the on periods on the uplink and downlink channels may have a benefit. If the on periods of the uplink and downlink channels are staggered so that they do not overlap, the mobile terminal 20 transmitter can be configured to bypass a duplexer of the mobile terminal 20. Because the duplexer normally results in an approximate 3 dBm path loss, the power savings can be significant.

Figure 3:
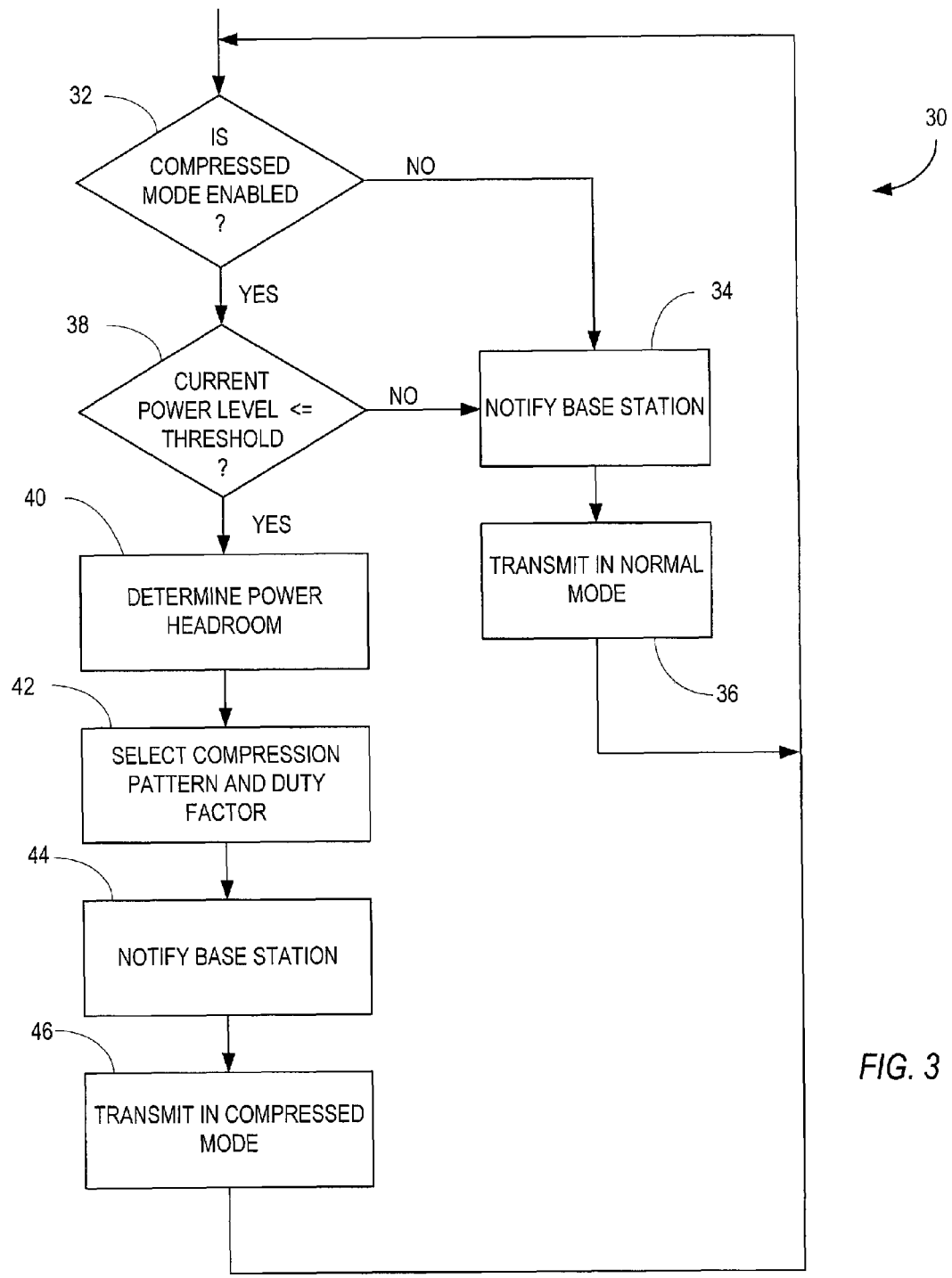
FIG. 3 is a flow chart illustrating mode control logic implemented in a mobile terminal.

FIG. 3 illustrates an exemplary method 30 implemented by the mobile terminal 20 for implementing compressed mode on the uplink channel. The method 30 enables the mobile terminal 20 to switch between a compressed mode and a normal mode on the uplink channel depending on its current transmit power level. Initially, the mobile terminal 20 determines whether compressed mode is enabled (block 32). In general, the base station 10 or other network node may control the uplink compressed mode based on the utilization of the uplink capacity and send a control signal to the mobile terminal 20 over a downlink control channel to enable and disable compressed mode. Compressed mode may be disabled when the uplink is heavily loaded and enabled when it is lightly loaded and there is excess uplink capacity. If the compressed mode is not enabled, the mobile terminal 20 notifies the base station 10 (block 34) and operates in a normal mode (block 36). The notification can be sent over an uplink control channel. If the mobile terminal 20 is already in compressed mode, the notification step can be omitted. If the compressed mode is enabled, the mobile terminal 20 determines whether to switch to compressed mode based on its current transmit power level (block 38). This determination can be made in several ways. One approach is for the mobile terminal 20 to compare its current transmit power level to a threshold power level $P_T$. If the current transmit power level is above the threshold power level $P_T$, the mobile terminal 20 operates in the normal mode. On the other hand, if the current transmit power level is below or equal to the threshold $P_T$, the mobile terminal 20 switches to the compressed mode. Alternatively, the mobile terminal 20 could compute its power headroom and compare the computed power headroom to a threshold.

One further method to enable uplink compressed mode relies on the loose correlation between uplink and downlink path loss. Generally, these two path losses are within several dB of each other. Thus, in addition to the condition that sufficient uplink capacity exists to tolerate the reduction due to noise from uplink burst collisions as discussed earlier, the base station can now also estimate whether the mobile transmitter has sufficient power amplifier margin to support higher data rates in a compressed duty factor mode, and command the mobile directly into the appropriate compressed mode. Further, the amount of duty factor reduction that can be tolerated could be estimated from the downlink path loss that is inferred by the base station knowledge of the transmit power being used to communicate with that specific mobile terminal. If very little base station transmit power is being used to communicate with the terminal, then the path loss is inferred to be low and the mobile is likewise not near its maximum output capability. Thus, the network can command the terminal use a compressed mode of a certain duty factor with some degree of safety that the mobile transmitter can support the new mode.

In the process of switching to compressed mode, the mobile terminal 20 determines its power headroom (block 40). Based on the power headroom, the mobile terminal 20 selects a compression pattern and duty factor to apply in the compressed mode (block 42). For example, if the power headroom is 3 dBm, the mobile terminal 20 may select a compression pattern that yields a 50% duty factor. Rather than calculating the power headroom, the mobile terminal 20 may select the duty factor based on its current transmit power level. Because the mobile terminal power is limited, using power headroom and current transmit power to determine the duty factor are equivalent.

There may be more than one compression pattern that yields a desired duty factor. In this case, the mobile terminal 20 could be programmed to randomly select one of several possible compression patterns yielding the desired duty factor. In one exemplary embodiment, the mobile terminal 20 may be programmed to use the mobile terminal serial number as a seed to generate a random number and select a compression pattern based on the generated number. For example, if the mobile terminal 20 has 3 dBm of power headroom, the mobile terminal may select one of several possible compression patterns that yields a 50% duty factor. If the mobile terminal 20 has 6 dBm of power headroom, the mobile terminal 20 may select one of several possible compression patterns that yield a duty factor of 25%. The availability of more than one compression pattern with the same duty factor enables different mobile terminals 20 to apply different compression patterns so that the mobile terminals 20 operating in a compressed mode do not all transmit at the same time. Alternatively, different mobile terminals 20 could be preconfigured to use different compression patterns, or could be controlled by the network to use designated compression patterns.

After selecting the compression pattern and duty factor, the mobile terminal 20 may notify the base station 10 that it is switching into the compressed mode (block 44). The compressed mode notification can be transmitted on an uplink control channel. The compressed mode notification may include the start time when the compressed mode will start, and may identify the compression pattern and duty factor applied. The mobile terminal 20 then begins transmitting in the compressed mode (block 46). The mobile terminal 20 periodically evaluates the transmit power and switches between the compressed mode and normal mode as long as the compressed mode is enabled.

Figure 4:
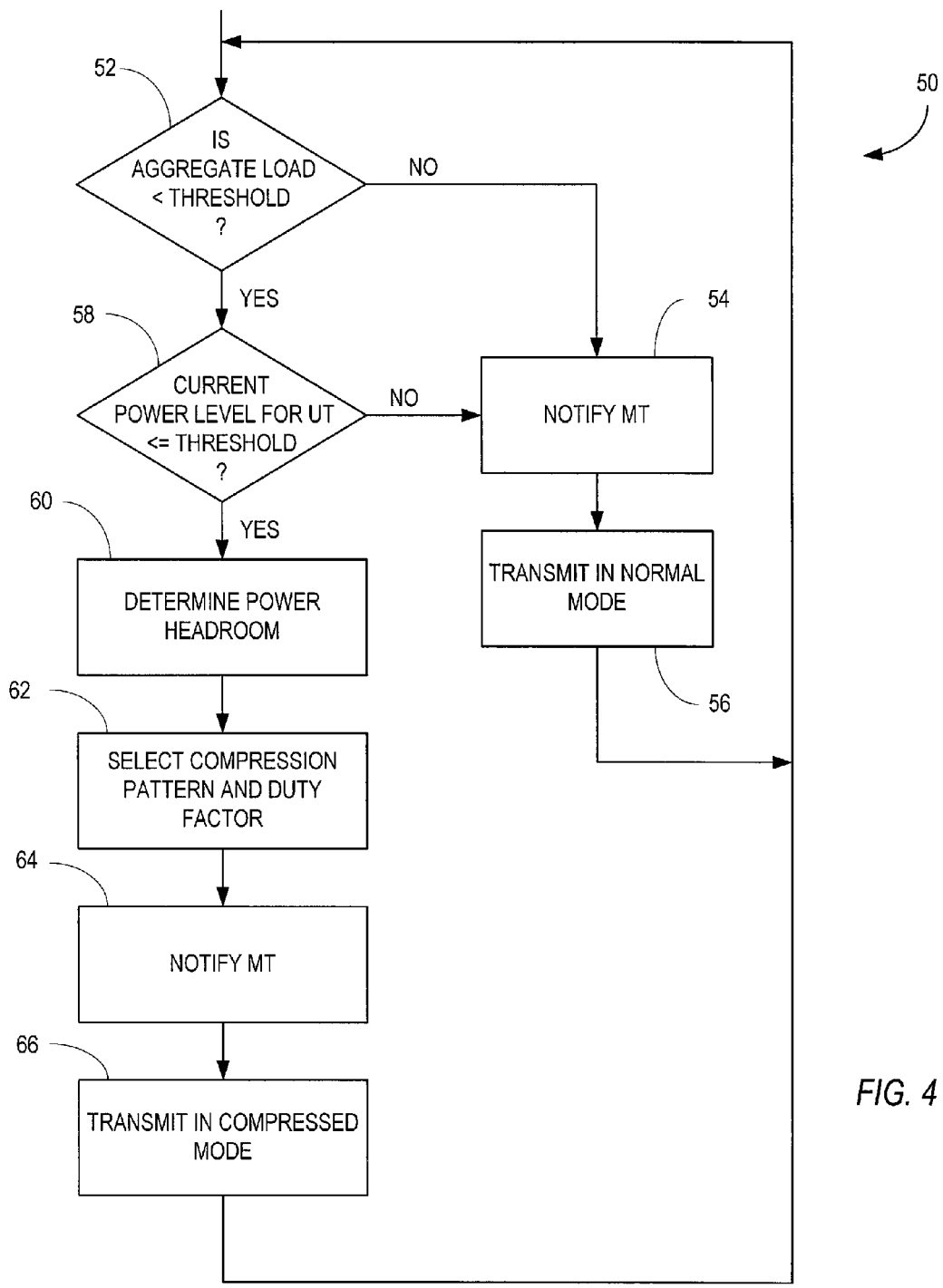
FIG. 4 is a flow diagram illustrating mode control logic in a base station.

FIG. 4 illustrates an exemplary method 50 used by the base station 10 to implement compressed mode on the downlink channel. The base station 10 initially determines whether the aggregate transmit power used to transmit to all mobile terminals 20 on the downlink channel is less than an aggregate threshold (block 52). If the total base station power is close to the maximum transmit power of the base station 10, compressed mode my not be allowed. A power threshold may be used to determine when compressed mode on the downlink is allowed. If the aggregate transmit power for all mobile terminals 20 is greater than the threshold, the base station 10 notifies the mobile terminalw 20 (block 54) and operates in the normal mode (block 56). If the aggregate transmit power for all mobile terminals 20 is less than the threshold, the base station 10 then determines separately for each mobile terminal 20 whether to switch the mobile terminal 20 to the compressed downlink mode (block 58).

Downlink compressed mode for an individual mobile terminal 20 may be determined based on the maximum allocated power for the mobile terminal 20. The base station 10 may set a limit on how much power it will allocate to any single mobile terminal 20 and control compressed mode for a particular mobile terminal 20 based on the allocated power available to the base station 10 to support higher data rates required by the compressed mode for that mobile terminal 20. The base station 10 may set a threshold power level for each mobile terminal 20. The individual power threshold may the same or may be different for each mobile terminal 20. If the individual power threshold is not satisfied, the base station 10 notifies the mobile terminal 20 (block 54) and transmits to that mobile terminal 20 in a normal mode (block 56). If the current transmit power level satisfies the threshold, the base station 10 may transmit in a compressed mode to the mobile terminal 20. Further, the base station or other network node may elect to allow some mobile terminals 20 to enter compressed mode on the downlink based on the current downlink power required for that mobile terminal 20, and possibly the power required by other mobile terminals 20, such that optimum utilization of the limited base station power can occur.

When the base station 10 switches to the compressed transmit mode, the base station 10 determines the power headroom (block 60) and selects a compression pattern and duty factor to use for the compressed mode based on the available power headroom (block 62). This selection can be made as previously described. After selecting the compression pattern and duty factor, the base station 10 notifies the mobile terminal 20 that it is switching to the compressed mode by sending a compressed mode notification to the mobile station on a downlink control channel (block 64). The compressed mode notification may include the start time for switching to the compressed mode, as well as the compression pattern and duty factor to be applied in the compressed mode. Thereafter, the base station 10 transmits in the compressed mode on the downlink channel (block 66).

Figure 5:
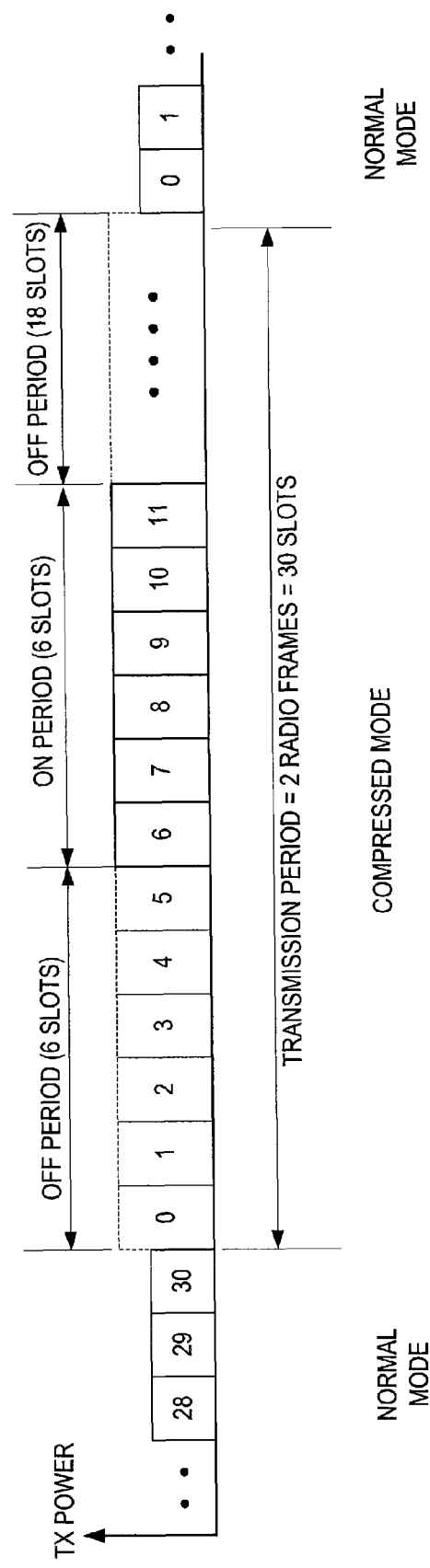
FIG. 5 illustrates an exemplary compression pattern for compressed mode operation.

FIG. 5 illustrates one implementation of compressed mode. A compression pattern is defined for a given transmission period. In one exemplary embodiment, the transmission period may be equal to two 10 millisecond radio frames. Each radio frame includes fifteen slots of 0.667 milliseconds duration. Thus, the transmission period comprises thirty slots or 20 milliseconds. In this example, the 20 millisecond transmission period is selected to match the vocoder time block for WCDMA. The compression pattern specifies the slots in which the transmitter is turned off. Slots coinciding with periods when the transmitter is turned off are referred to herein as "off slots." Slots coinciding with periods when the transmitter is turned on are called "on slots." A series of consecutive slots in which the transmitter is turned on is referred to herein as an "on period." A series of consecutive slots in which the transmitter is turned off is referred to herein as an "off period." The duty factor equals the number of off slots divided by the total number of slots in the transmission period. Thus, a 20% duty factor means that the transmitter is turned off for five slots in a transmission period. The off slots may be consecutive, or may be distributed over the transmission period.

FIG. 5 illustrates a compression pattern with a 20% duty factor. In this exemplary pattern, the transmitter is turned on in slots 0-4, turned off in slots 5-9, and turned on in slots 10-30. The location of the off slots in the transmission period can be varied. Assuming that the off slots are consecutive, up to six compression patterns can be defined with non-overlapping off periods. When a mobile terminal 20 operates in compressed mode with a 20% duty factor, the mobile terminal 20 can select a compression pattern from any one of these six compression patterns. As noted earlier, allowing the mobile terminals 20 to select different compression patterns with the same duty factor prevents all of the mobile terminals 20 operating in the compressed mode from transmitting at the same time.

When the mobile terminal 20 is operating in the compressed mode, the mobile terminal 20 may increase the transmit power during on periods if necessary in order to maintain a desired data rate as shown in FIG. 5. For example, if a transmit power level of 21 dBm is needed to transmit at an agreed-upon data rate in a normal mode, the mobile terminal 20 may need to increase the transmit power to 24 dBm in order to apply a 50% duty factor in compressed mode and maintain the data rate. Alternatively, the data rate could be reduced. There may be circumstances, however, where the mobile terminal 20 can maintain the agreed-upon data rate without increasing its transmit power level in the on periods. In this case, substantial reduction in power consumption can be realized. The amount of the increase in the transmit power level may be related to the duty factor. In the example given above, the increase in the transmit power level equals the inverse of the duty factor. Thus, a 50% duty factor equates to a two-fold increase in transmit power level.

There may be circumstances when a mobile terminal 20 needs to enter into a compressed mode for reasons other than to reduce power consumption. For example, current standards for WCDMA mobile terminals 20 allow a compressed mode of operation on at least the downlink to enable mobile terminals 20 to make measurements on another frequency prior to an interfrequency or intersystem handover. Typically, the mobile terminal receiver (and of the transmitter as well) is turned off only for a short period of time to enable the mobile terminal to make measurements. Because reducing power consumption is not the focus for this type of compressed mode, the compression pattern for this type of compressed mode will differ significantly than compressed mode for purposes of reducing power consumption. If the mobile terminal 20 supports compressed mode for measurement purposes, the base station or network may disable the compressed mode described herein for reducing power consumption (FIG. 3, block 32) when the mobile terminal 20 indicates a need for an intersystem handover that requires the mobile terminal 20 to make measurements.

Figure 6:
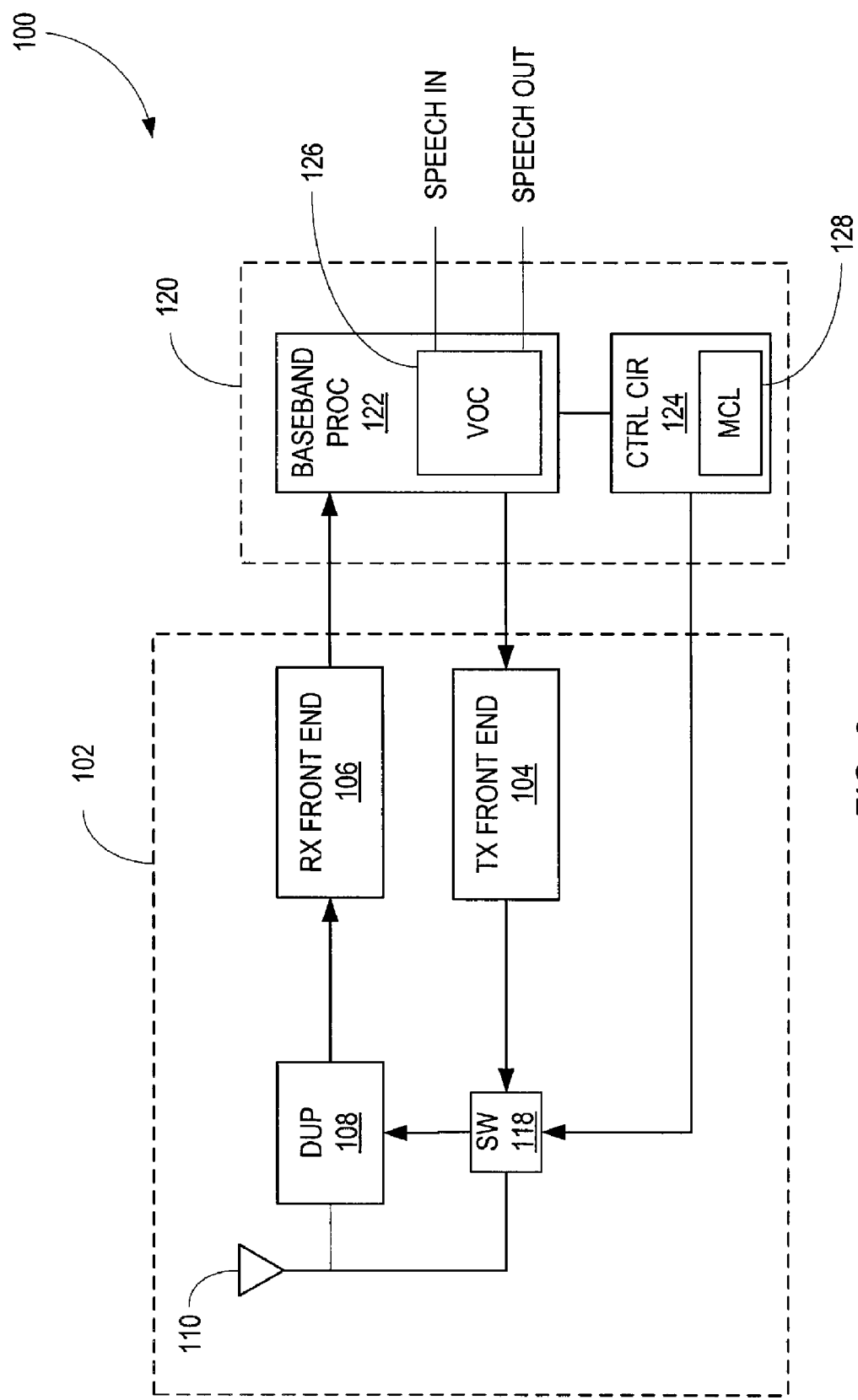
FIG. 6 illustrates an exemplary transceiver station for implementing compressed mode.

FIG. 6 illustrates a transceiver station 100 according to one exemplary embodiment. The transceiver station 100 may comprise a base station 10 or mobile terminal 20 as shown in FIG. 1. The transceiver station 100 comprises a radio frequency section 102 and a digital section 120. The radio frequency section 102 comprises a transmitter front end circuit 104, a receiver front end circuit 106, a duplexer 108, and a shared antenna 110. The transmitter front end circuit 104 upconverts, filters, and amplifies signals output by the digital section 120 for transmission via antenna 110. A D-to-A converter (not shown) converts signals output to the transmitter front end 100. Receiver front end circuit 106 downconverts the receive signals to baseband frequency, and then filters and amplifies the received signal. An A-to-D converter (not shown) converts the receive signal to digital form for processing in digital section 120. Duplexer 108, couples both the transmitter front end 104 and receiver front end 106 to the shared antenna 110. As noted earlier, the duplexer 108 introduces path losses in the order of three dBm. A bypass circuit 118 in the transmit path bypasses the duplexer 108. As will be described below, the bypass circuit 118 may comprise a switch (SW) to bypass the duplexer 108 in certain conditions to avoid the path losses introduced by the duplexer 108.

The digital section 120 comprises a baseband processor 122 and control circuits 124. The baseband processor 122 and control circuits 124 may comprise one or more processors or processing circuits. The baseband processor 122 processes signals transmitted and received by the transceiver station 100. The baseband processor 122 encodes, modulates, and spreads transmitted signals. On the receiver side, the baseband processor 122 despreads, demodulates, and decodes the received signal. The baseband processor 122 also implements a vocoder 126 for encoding and decoding speech signals.

The control circuits 124 control the overall operation of the transceiver station 100. The control circuits 124 include mode control logic 128 for switching between normal mode and compressed mode as herein described. For uplink transmissions, the mode control logic (MCL) 128 determines whether compressed mode is enabled, and determines what compression pattern and duty factor to use in compressed mode. On the downlink channel, the mode control logic 128 switches to the compressed mode responsive to control signals received from the remote station. The mode control logic 128 may also reconfigure the transmit path to by-pass the duplexer 108 when compressed mode is enabled on both the uplink and downlink channels. The transmit path may be reconfigured by connecting the transmitter front end 104 to the antenna 110 via a direct path rather than through the duplexer 108.

The present invention provides a method and apparatus for substantially reducing power consumption in a WCDMA terminal. The present invention may be applied to either a mobile terminal or base station. When applied to a mobile terminal, the present invention results in longer battery life and talk times. The present invention is also beneficial in reducing overall interference in the network.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of reducing power consumption in a code division multiple access terminal, said method comprising:

switching between a compressed transmission mode and a normal transmission mode based on the current transmit power level of the terminal; and alternately switching a transmitter on and off in accordance with a defined compression pattern having a desired duty factor in said compressed transmission mode.

2. The method of claim 1 wherein switching between a compressed transmission mode and a normal transmission mode based on the current transmit power level of the mobile terminal comprises:
   periodically comparing the current transmit power level of the terminal to a power threshold;
   transmitting in said compressed transmission mode when the current transmit power level is below said threshold requirement; and
   transmitting in said normal transmission mode when said current transmission power level is greater than said threshold.

3. The method of claim 1 wherein the compression pattern comprises a sequence of on and off periods in a defined transmission period.

4. The method of claim 3 wherein a data transmission rate is increased during on periods in said compressed transmission mode.

5. The method of claim 4 wherein the data transmission rate is increased by a factor equal to an inverse of the duty factor during said on periods.

6. The method of claim 3 wherein the compression pattern repeats in successive transmission periods.

7. The method of claim 3 wherein the compression pattern changes in successive transmission periods.

8. The method of claim 3 wherein the transmission period is synchronized to a vocoder frame timing.

9. The method of claim 8 wherein one vocoder block is transmitted during each transmission period.

10. The method of claim 9 wherein the transmission period is equal to 20 milliseconds.

11. The method of claim 1 further comprising dynamically selecting the duty factor for said compressed transmission mode.

12. The method of claim 11 wherein the duty factor is dynamically selected based on current power level or power headroom of said terminal.

13. The method of claim 1 further comprising selectively enabling said compressed transmission mode responsive to signals received from a remote terminal.

14. The method of claim 1 further comprising receiving in a compressed receiving mode.

15. The method of claim 14 wherein a transmitter is alternately switched on and off in accordance with a first compression pattern in said compressed transmission mode, and wherein a receiver is alternately switched on and off in accordance with a second compression pattern having a desired duty factor in said compressed receiving mode.

16. The method of claim 15 wherein the on periods in said first compression pattern coincide with off periods in said second compression pattern.

17. The method of claim 16 further comprising configuring said transmitter to bypass a duplexing circuit when said mobile terminal is operating in both said compressed transmission and compressed receiving modes are enabled.

18. The method of claim 14 further comprising selectively enabling said compressed receiving mode responsive to signals received from a remote terminal.

19. The method of claim 1 wherein said compressed mode is applied to an uplink channel between a mobile terminal and a base station and further comprising selectively enabling said compressed mode based on the utilization of the uplink channel.

20. The method of claim 1 wherein said compressed mode is applied to a downlink channel between a mobile terminal and a base station and further comprising selectively enabling said compressed mode based on the aggregate transmit power used to transmit to a plurality of mobile terminals.

21. The method of claim 20 further comprising switching the mobile terminal to compressed receiving mode on said downlink channel depending on the current transmit power used to transmit to said mobile terminal.

22. A transceiver station comprising:
   a transmitter configured to transmit signals to a remote terminal in one of a compressed transmission mode and a normal transmission mode, wherein the transmitter switches on and off according to a defined compression pattern having a desired duty factor in said compressed transmission mode;
   a receiver configured to receive signals from the remote terminal; and
   a control circuit configured to switch the transmitter between the compressed transmission mode and the normal transmission mode based on a current transmit power level of the transceiver station.

23. The transceiver station of claim 22 wherein the control circuit is further configured to:
   periodically compare the current transmit power level of the transceiver station to a power threshold;
   select said compressed transmission mode when the current transmit power level is below said threshold requirement; and
   select said normal transmission mode when said current transmission power level is greater than said threshold.

24. The transceiver station of claim 22 wherein the compression pattern comprises a sequence of on and off periods in a defined transmission period.

25. The transceiver station of claim 24 wherein a data transmission rate of the transmitter increases during on periods in said compressed transmission mode.

26. The transceiver station of claim 25 wherein the data transmission rate increases during said on periods by a factor that is equal to an inverse of the duty factor.

27. The transceiver station of claim 24 wherein the compression pattern repeats in successive transmission periods.

28. The transceiver station of claim 24 wherein the compression pattern changes in successive transmission periods.

29. The transceiver station of claim 24 wherein the transmission period is synchronized to a vocoder timing block.

30. The transceiver station of claim 29 wherein the transmitter is configured to transmit one vocoder block during each transmission period when the transmitter is in said compressed transmission mode.

31. The transceiver station of claim 30 wherein the transmission period is equal to 20 milliseconds.

32. The transceiver station of claim 22 wherein the control circuit dynamically selects the duty factor for said compressed transmission mode.

33. The transceiver station of claim 32 wherein the control circuit dynamically selects the duty factor based on the current power level or power headroom of said terminal.

34. The transceiver station of claim 22 wherein the control circuit selectively enables said compressed transmission mode responsive to signals received from the remote terminal.

35. The transceiver station of claim 22 wherein the receiver receives the signals from the remote terminal in a compressed receiving mode.

36. The transceiver station of claim 35 wherein the control circuit is configured to:

alternately switch the transmitter on and off based on a first compression pattern when the transmitter is in said compressed transmission mode; and alternately switch the receiver on and off based on a second compression pattern when the receiver is in said compressed receiving mode.

37. The transceiver station of claim 36 wherein the on periods in said first compression pattern coincide with off periods in said second compression pattern.

38. The transceiver station of claim 37 further comprising a duplexer circuit, and wherein the control circuit is further configured to cause said transmitter to bypass the duplexer circuit when said transceiver station is operating in both said compressed transmission and compressed receiving modes.

39. The transceiver station of claim 35 wherein the control circuit is configured to selectively enable said compressed receiving mode in said receiver responsive to signals received from the remote terminal.

40. The transceiver station of claim 22 wherein said transceiver station comprises a mobile terminal and wherein said compressed mode is applied to an uplink channel between said mobile terminal and a base station.

41. The transceiver station of claim 40 wherein compressed mode is enabled based on utilization of uplink capacity.

42. The transceiver station of claim 22 wherein said transceiver station comprises a base station and wherein said compressed mode is applied to a downlink channel between said base station and a mobile terminal.

43. The transceiver station of claim 42 wherein said control circuit selectively enables said compressed mode based on the aggregate transmit power used to transmit to a plurality of mobile terminals.

44. The transceiver station of claim 43 wherein said control circuit signals said mobile terminal to switch to said compressed receiving mode on said downlink channel based on the current transmit power used to transmit to said mobile terminal.

* * * * *